United States Patent Office 3,449,239
Patented June 10, 1969

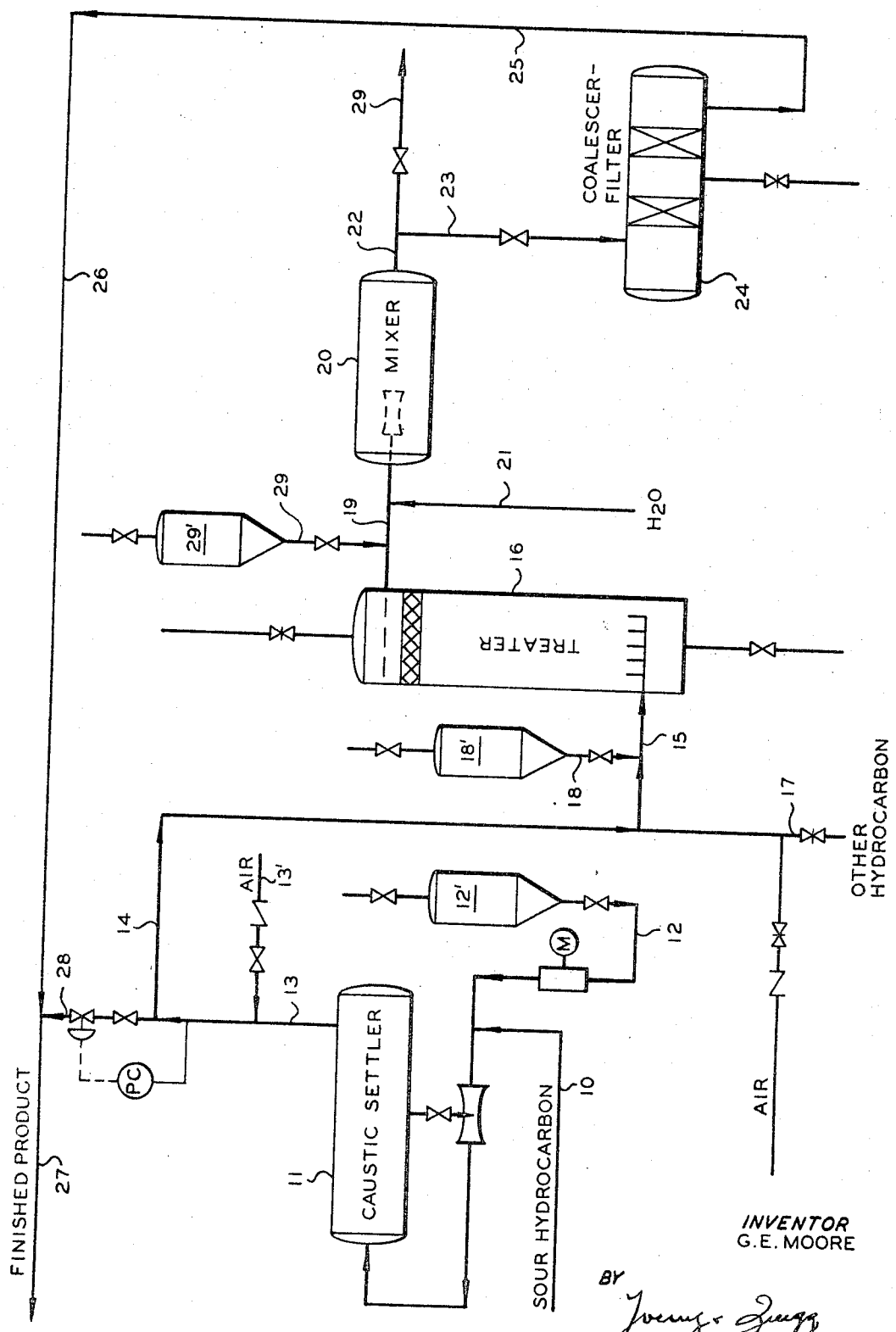

3,449,239
DIAZINE IN A HYDROCARBON SWEETENING PROCESS
Gerald E. Moore, Okmulgee, Okla., assignor to Phillips Petroleum Company, a corporation of Delaware
Filed July 18, 1966, Ser. No. 565,937
Int. Cl. C10g 29/20, 19/02
U.S. Cl. 208—198                7 Claims

ABSTRACT OF THE DISCLOSURE

Sweetening of sour hydrocarbon streams is carried out by contacting said streams with a sweetening reagent, air and a diazine, such as piperazine. The sweetening reagent may be a caustic solution of phthalocyanine or lead sulfide on an inert carrier. The diazine is added to the reaction to minimize plugging of the product filters and also to improve the water separometer index of the sweetened hydrocarbon.

---

This invention relates, broadly, to the sweetening of sour hydrocarbon containing streams in the presence of a novel inhibitor. In accordance with one aspect, this invention relates to the sweetening of sour hydrocarbon distillates in the presence of a novel heterocyclic nitrogen containing compound which minimizes plugging of the product filters, improves the water separometer index of the sweetened hydrocarbon distillate, and accelerates product brightening in storage.

Conventional practice at the present time includes the treatment of sour hydrocarbon distillates to remove mercaptans by contacting the hydrocarbon distillate with a sweetening reagent. Various methods and reagents have either been used or proposed for the sweetening of hydrocarbon fractions, such as the light petroleum distillates. Chemical reagents that have been used include solutions of sodium plumbite, alkaline sodium hypochlorite, alkali metal sulfides and polysulfides, certain dry solid reagents such as dry copper chloride, phthalocyanine compounds, litharge, lead sulfide, and the like. In many of these systems problems have been encountered such as filter plugging, low water separometer index, and the like.

According to the invention, I have found that by carrying out the sweetening of hydrocarbon distillates in the presence of certain diazines that product filter plugging is minimized, emulsion problems are minimized, and the water separometer index of the sweetened hydrocarbon is substantially improved.

Accordingly, an object of this invention is to provide an improved process for sweetening sour hydrocarbon distillates.

Another object of this invention is to provide novel inhibitors suitable for use during the sweetening of hydrocarbon distillate streams, made necessary due to the addition of surfactants to the streams being processed or due to the existence of natural surfactants or emulsifiers.

Other aspects, objects and the several advantages of this invention will be apparent to those skilled in the art upon a study of this disclosure, the drawing, and the claims.

According to the invention, in hydrocarbon sweetening processes wherein mercaptans are oxidized to disulfides, a diazine is added to the system to minimize plugging of the product filters and to also improve the water separometer index of the sweetened hydrocarbon.

Diazines that can be employed according to the invention are six-membered heterocyclic compounds containing two nitrogen atoms, and include such compounds as pyridazine, pyrimidine, pyrazine, particularly hexahydropyrazine, as well as the substituted, for example, alkyl-substituted, diazines. The representative example of alkyl-substituted pyrazine is 2,5-dimethyl pyrazine. Ordinarily, the alkyl substituents will contain from 1 to 5 carbon atoms. A presently preferred diazine is piperazine (hexahydropyrazine).

The amount of diazine employed during the sweetening process will vary depending upon the particular hydrocarbon sweetening reagent employed. Ordinarily, the concentration of diazine will be from .0005 to .05 percent, or more, and preferably from about .0005 to .01 percent by weight of the hydrocarbon distillate.

The sweetening reaction comprises a conversion of mercaptans to disulfides through an oxidation reaction and, therefore, air is ordinarily present in the sweetening reaction. The amount of air employed should be sufficient to effect the desired oxidation. In many instances, air dissolved or entrained in the hydrocarbon distillate will be sufficient to effect the desired oxidation.

The process of the present invention can be effected with any suitable known sweetening reagent. Presently preferred sweetening reagents comprise: (1) a fixed bed of lead sulfide on an inert carrier, or (2) aqueous caustic solution of a phthalocyanine, e.g., cobalt phthalocyanine.

The present invention is particularly advantageous when employed with straight run and/or cracked gasoline boiling range materials. It is to be understood, however, that with suitable modifications the process of the invention can be utilized for the treatment of other hydrocarbon distillates including kerosene, diesel fuel, gas oil, jet fuels, and the like.

The conditions employed and the particular sweetening reagents employed according to the invention are both well known in the art. Generally, the sweetening reaction can be readily effected at atmospheric conditions.

A better understanding of the invention will be obtained upon reference to the accompanying drawing which diagrammatically illustrates one presently preferred embodiment for practicing the invention.

Referring now to the drawing, an untreated hydrocarbon distillate, such as jet fuel, is passed to a caustic washer 11 by way of line 10. A small amount of aqueous piperazine is introduced during caustic change-out into line 10 by way of line 12 from pot 12'; and/or a small amount of piperazine in water or aqueous caustic is introduced into line 15 by way of line 18 from pot 18' which can be along with additional sweetening reagent. In addition, a small amount of aqueous piperazine can be introduced into line 19 by way of line 29 from pot 29'. In caustic washer 11 $H_2S$ and light mercaptans are removed by the caustic containing piperazine. Caustic washed distillate is removed from washer 11 by way of line 13 and along with air added by way of line 13' is passed by way of line 14 and line 15 and introduced into sweetening zone 16.

When desired, a hydrocarbon distillate free of $H_2S$ can be passed directly by way of line 17 to sweetening zone 16. In such event, the $H_2S$-free hydrocarbon distillate would not be caustic washed prior to introduction into the sweetening zone.

In sweetening zone 16, the mercaptan-sour hydrocarbon distillate containing piperazine and dissolved oxygen introduced by way of line 15 is at least in part contacted with a suitable sweetening reagent having piperazine therein in zone 16 to convert the mercaptan sulfur present in the distillate to disulfides. Depending upon the mercaptan sulfur specifications for products, a portion of the hydrocarbon may by-pass the sweetening zone by way of line 28. Suitable sweetening reagents that can be employed in tower 16 includes aqueous caustic solution, methanol, and a phthalocyanine catalyst, e.g., cobalt phthalocyanine or cobalt phthalocyanine disulfonate; or a litharge type system, e.g., comprising adding litharge to the mercaptansour hyrocarbon containing added caustic or doctor solution, sulfur, and oxygen, and contacting this admixture with a fixed bed of lead sulfide deposited on an inert carrier, such as Carborundum. Sweetened hydrocarbon distillate is removed from 16 by way of line 19 and introduced into mixing drum 20. Water can be introduced into line 19 by way of line 21. The mixed stream is introduced into mixing drum 20 through a venturi type of mixer. The effluent from the mixing drum is removed by way of line 22 and passed by way of line 23 through coalescer filter 24 to remove the treating reagent, as well as other separable materials, from the sweetened distillate stream. The filtered sweetened stream is removed from zone 24 by way of line 25 and passed to storage by way of line 27. When desired, the coalescer filter 24 can be by-passed in toto, or at least in part, by passing the effluent from mixing drum 20 through lines 22 and 29 and then to storage or other use.

It has been found that by carrying out the sweetening of hydrocarbon distillates in the presence of diazines as set forth above, plugging of the product filters, i.e., coalescer filter 24, is minimized and the water separometer index of the sweetened hydrocarbon is substantially improved.

SPECIFIC EXAMPLE

|  | Range | Specific |
|---|---|---|
| Caustic wash system: |  |  |
| Aqueous caustic, percent NaOH | 5–50 | 10 |
| Piperazine, wt. percent of caustic | 0.01–0.1 | 0.05 |
| Temperature, °F | 25–220 | 100 |
| Pressure, p.s.i.a. | 25–200 | 30 |
| Hydrocarbon/caustic vol. ratio | 1:5–5:1 | 1:1 |
| Treating system (sweetening): |  |  |
| Aqueous caustic (1), percent NaOH | 5–50 | 10 |
| Cobalt phthalocyanine, p.p.m. of caustic | 5–250,000 | 50 |
| Air, s.c.f./bbl. of hydrocarbon | To saturate | To saturate |
| Vol. hydrocarbon/vol. reagent/hour | 15:1–8:1 | 12:1 |
| Temperature, °F | 25–220 | 100 |
| Pressure, p.s.i.a. | 25–200 | 30 |
| Wash water (21); vol. water/vol. hydrocarbon | 1:5–1:25 | 1:14 |

| Jet fuel | Weight percent $H_2S$ | Weight percent mercaptan S |
|---|---|---|
| Untreated | .024 | .0035 |
| Treated | 0.000 | 0.0002 |

Reasonable variation and modification are possible within the scope of the foregoing disclosure, drawing and the appended claims to the invention, the essence of which is that, in the sweetening of sour hydrocarbon distillates, diazines, such as hexahydropyrazine, are added to the sweetening system to minimize plugging of the product filters and to also improve the water separometer index of the sweetened hydrocarbon.

I claim:
1. A process for sweetening a sour hydrocarbon containing stream which comprises oxidizing mercaptans present in said stream by contacting with a sweetening reagent, air and piperazine to convert the mercaptans to disulfides, the amount of piperazine present being sufficient to minimize plugging of the product filters and to improve the water separometer index of the sweetened hydrocarbon stream.

2. A process according to claim 1 wherein the amount of piperazine present is in the range .0005 to .05 percent by weight of the hydrocarbon.

3. A process according to claim 1 wherein the hydrocarbon stream contains hydrogen sulfide, which stream is caustic washed before contacting with said sweetening reagent and at least a portion of said piperazine is in the caustic used in the caustic treating operation.

4. A process according to claim 3 wherein said piperazine is added as an aqueous mixture.

5. A process according to claim 4 wherein said aqueous mixture is a solution of piperazine containing about 20 percent piperazine in water and the concentration of said mixture added to the caustic treating solution is about 0.5 weight percent.

6. A process according to claim 5 wherein said sweetening reagent is lead sulfide on an inert carrier.

7. A process according to claim 5 wherein said sweetening reagent is a caustic solution of phthalocyanine.

References Cited

UNITED STATES PATENTS

| 3,294,760 | 12/1966 | Hay | 208—191 |
| 2,671,048 | 3/1954 | Rosenwald | 208—207 |
| 2,744,854 | 5/1956 | Urban | 208—206 |
| 2,978,405 | 4/1961 | Bowers | 208—206 |

DELBERT E. GANTZ, *Primary Examiner.*

G. J. CRASANAKIS, *Assistant Examiner.*

U.S. Cl. X.R.

208—206, 207